(12) United States Patent
Hunt et al.

(10) Patent No.: US 8,160,984 B2
(45) Date of Patent: Apr. 17, 2012

(54) SIMILARITY MATCHING OF A COMPETITOR'S PRODUCTS

(75) Inventors: Herbert Dennis Hunt, San Francisco, CA (US); John Randall West, Sunnyvale, CA (US); Marshall Ashby Gibbs, Clarendon Hills, IL (US); Bradley Michael Griglione, Lake Zurich, IL (US); Gregory David Neil Hudson, Riverside, IL (US); Andrea Basilico, Manera di Lomazzo (IT); Arvid C. Johnson, Frankfort, IL (US); Cheryl G. Bergeon, Arlington Heights, IL (US); Craig Joseph Chapa, Lake Barrington, IL (US); Alberto Agostinelli, Trezzo sull'Adda (IT); Jay Alan Yusko, Lombard, IL (US); Trevor Mason, Bolingbrook, IL (US)

(73) Assignee: SymphonyIRI Group, Inc., Chicago, IL (US)

( * ) Notice: Subject to any disclaimer, the term of this patent is extended or adjusted under 35 U.S.C. 154(b) by 449 days.

(21) Appl. No.: 12/023,305

(22) Filed: Jan. 31, 2008

(65) Prior Publication Data

US 2008/0294583 A1    Nov. 27, 2008

Related U.S. Application Data

(63) Continuation-in-part of application No. 12/021,263, filed on Jan. 28, 2008, now abandoned.

(60) Provisional application No. 60/886,798, filed on Jan. 26, 2007, provisional application No. 60/886,801, filed on Jan. 26, 2007, provisional application No. 60/887,573, filed on Jan. 31, 2007, provisional application No. 60/891,508, filed on Feb. 24, 2007, provisional application No. 60/891,936, filed on Feb. 27, 2007, provisional application No. 60/952,898, filed on Jul. 31, 2007.

(51) Int. Cl.
*G06F 17/00* (2006.01)
*G06N 5/02* (2006.01)
(52) U.S. Cl. .............................. 706/46; 358/474; 705/78
(58) Field of Classification Search .................... 706/46; 705/26
See application file for complete search history.

(56) References Cited

U.S. PATENT DOCUMENTS 3,660,605 A    5/1972    Rees
(Continued)

FOREIGN PATENT DOCUMENTS

WO    WO-2008/092147 A2    7/2008
(Continued)

OTHER PUBLICATIONS

"U.S. Appl. No. 12/021,263, Non Final Office Action mailed Jul. 22, 2009", , 24 pgs.
(Continued)

*Primary Examiner* — Omar Fernandez Rivas
*Assistant Examiner* — Kalpana Bharadwaj
(74) *Attorney, Agent, or Firm* — Strategic Patents, P.C.

(57) ABSTRACT

In embodiments of the present invention improved capabilities are described for identifying a classification scheme associated with product attributes of a grouping of products of an entity, receiving a record of data relating to an item of a competitor to the entity, the classification of which is uncertain, receiving a dictionary of attributes associated with products, and assigning a product code to the item, based on probabilistic matching among the attributes in the classification scheme, the attributes in the dictionary of attributes and at least one known attribute of the item.

12 Claims, 3 Drawing Sheets

U.S. PATENT DOCUMENTS

| | | | |
|---|---|---|---|
| 4,047,157 A | 9/1977 | Jenkins |
| 4,884,264 A | 11/1989 | Servel et al. |
| 5,446,878 A | 8/1995 | Royal |
| 5,596,331 A | 1/1997 | Bonaffini et al. |
| 5,832,509 A | 11/1998 | Mortis et al. |
| 5,912,887 A | 6/1999 | Sehgal |
| 5,915,036 A | 6/1999 | Grunkin et al. |
| 5,978,788 A | 11/1999 | Castelli et al. |
| 6,098,033 A | 8/2000 | Richardson et al. |
| 6,163,774 A | 12/2000 | Lore et al. |
| 6,167,405 A | 12/2000 | Rosensteel et al. |
| 6,212,524 B1 | 4/2001 | Weissman et al. |
| 6,233,573 B1 | 5/2001 | Bair et al. |
| 6,282,544 B1 | 8/2001 | Tse et al. |
| 6,430,545 B1 | 8/2002 | Honarvar et al. |
| 6,456,997 B1 | 9/2002 | Shukla |
| 6,523,025 B1 | 2/2003 | Hashimoto et al. |
| 6,643,635 B2 | 11/2003 | Nwabueze |
| 6,662,192 B1 | 12/2003 | Rebane |
| 6,965,886 B2 | 11/2005 | Govrin et al. |
| 7,043,492 B1 | 5/2006 | Neal et al. |
| 7,107,254 B1 | 9/2006 | Dumais et al. |
| 7,117,215 B1 | 10/2006 | Kanchwalla et al. |
| 7,133,865 B1 | 11/2006 | Pedersen et al. |
| 7,177,855 B2 | 2/2007 | Witkowski et al. |
| 7,191,183 B1 | 3/2007 | Goldstein |
| 7,239,989 B2 | 7/2007 | Kothuri |
| 7,333,982 B2 | 2/2008 | Bakalash et al. |
| 7,360,697 B1 | 4/2008 | Sarkar et al. |
| 7,376,573 B1 | 5/2008 | Costonis et al. |
| 7,430,532 B2 | 9/2008 | Wizon et al. |
| 7,437,344 B2 | 10/2008 | Peyrelevade |
| 7,469,246 B1 | 12/2008 | Lamping |
| 7,606,699 B2 | 10/2009 | Sundararajan et al. |
| 7,672,877 B1 | 3/2010 | Acton et al. |
| 7,800,613 B2 | 9/2010 | Hanrahan et al. |
| 7,870,031 B2 | 1/2011 | Bolivar |
| 7,870,039 B1 | 1/2011 | Dom et al. |
| 2001/0034679 A1 | 10/2001 | Wrigley |
| 2001/0044758 A1 | 11/2001 | Talib et al. |
| 2002/0004390 A1 | 1/2002 | Cutaia et al. |
| 2002/0035562 A1 | 3/2002 | Roller et al. |
| 2002/0065707 A1 | 5/2002 | Lancaster et al. |
| 2002/0067593 A1 | 6/2002 | Milan |
| 2002/0078018 A1 | 6/2002 | Tse et al. |
| 2002/0078039 A1 | 6/2002 | Cereghini et al. |
| 2002/0091681 A1 | 7/2002 | Cras et al. |
| 2002/0116213 A1 | 8/2002 | Kavounis et al. |
| 2002/0161520 A1 | 10/2002 | Dutta et al. |
| 2002/0186818 A1 | 12/2002 | Arnaud et al. |
| 2002/0194145 A1 | 12/2002 | Boucher et al. |
| 2003/0028424 A1* | 2/2003 | Kampff et al. .................. 705/14 |
| 2003/0036270 A1 | 2/2003 | Yu et al. |
| 2003/0088565 A1 | 5/2003 | Walter et al. |
| 2003/0126143 A1 | 7/2003 | Roussopoulos et al. |
| 2003/0149586 A1 | 8/2003 | Chen et al. |
| 2003/0158703 A1 | 8/2003 | Lumme et al. |
| 2003/0177055 A1 | 9/2003 | Zimmerman, Jr. et al. |
| 2003/0210278 A1* | 11/2003 | Kyoya et al. .................. 345/810 |
| 2003/0228541 A1 | 12/2003 | Hsu et al. |
| 2003/0233297 A1 | 12/2003 | Campbell |
| 2004/0015472 A1 | 1/2004 | Netz et al. |
| 2004/0030593 A1 | 2/2004 | Webster et al. |
| 2004/0098390 A1 | 5/2004 | Bayliss et al. |
| 2004/0122646 A1 | 6/2004 | Colossi et al. |
| 2004/0193683 A1 | 9/2004 | Blumofe |
| 2004/0210562 A1 | 10/2004 | Lee et al. |
| 2004/0220937 A1 | 11/2004 | Bickford et al. |
| 2004/0225670 A1 | 11/2004 | Cameron et al. |
| 2005/0043097 A1 | 2/2005 | March et al. |
| 2005/0060300 A1 | 3/2005 | Stolte et al. |
| 2005/0065771 A1 | 3/2005 | Chen et al. |
| 2005/0149537 A1 | 7/2005 | Balin et al. |
| 2005/0187977 A1 | 8/2005 | Frost |
| 2005/0197883 A1 | 9/2005 | Kettner et al. |
| 2005/0216512 A1 | 9/2005 | Dor |
| 2005/0237320 A1 | 10/2005 | Itoh et al. |
| 2005/0240085 A1 | 10/2005 | Knoell et al. |
| 2005/0240577 A1 | 10/2005 | Larson et al. |
| 2005/0246307 A1 | 11/2005 | Bala |
| 2005/0246357 A1 | 11/2005 | Geary et al. |
| 2005/0251513 A1 | 11/2005 | Tenazas |
| 2005/0267889 A1 | 12/2005 | Snyder et al. |
| 2006/0009935 A1 | 1/2006 | Uzarski et al. |
| 2006/0028643 A1 | 2/2006 | Gottlieb et al. |
| 2006/0080141 A1 | 4/2006 | Fusari et al. |
| 2006/0080294 A1 | 4/2006 | Orumchian et al. |
| 2006/0164257 A1 | 7/2006 | Giubbini |
| 2006/0212413 A1 | 9/2006 | Rujan et al. |
| 2006/0218157 A1 | 9/2006 | Sourov et al. |
| 2006/0218159 A1 | 9/2006 | Murphy et al. |
| 2006/0242160 A1 | 10/2006 | Kanchwalla et al. |
| 2006/0259358 A1 | 11/2006 | Robinson et al. |
| 2006/0282339 A1 | 12/2006 | Musgrove et al. |
| 2007/0028111 A1 | 2/2007 | Covely |
| 2007/0050327 A1 | 3/2007 | Roller et al. |
| 2007/0050340 A1 | 3/2007 | von Kaenel et al. |
| 2007/0061185 A1 | 3/2007 | Peters et al. |
| 2007/0118541 A1 | 5/2007 | Nathoo |
| 2007/0160320 A1* | 7/2007 | McGuire et al. ................ 385/15 |
| 2007/0174290 A1 | 7/2007 | Narang et al. |
| 2007/0203919 A1 | 8/2007 | Sullivan et al. |
| 2007/0276676 A1 | 11/2007 | Hoenig et al. |
| 2007/0294208 A1 | 12/2007 | Chowdhary et al. |
| 2008/0033914 A1 | 2/2008 | Cherniack et al. |
| 2008/0059489 A1 | 3/2008 | Han et al. |
| 2008/0077469 A1 | 3/2008 | Philport et al. |
| 2008/0162302 A1 | 7/2008 | Sundaresan et al. |
| 2008/0228797 A1 | 9/2008 | Kenedy et al. |
| 2008/0256275 A1 | 10/2008 | Hofstee et al. |
| 2008/0270363 A1 | 10/2008 | Hunt et al. |
| 2008/0276232 A1 | 11/2008 | Aguilar et al. |
| 2008/0288209 A1 | 11/2008 | Hunt et al. |
| 2008/0288522 A1 | 11/2008 | Hunt et al. |
| 2008/0288538 A1 | 11/2008 | Hunt et al. |
| 2008/0294372 A1 | 11/2008 | Hunt et al. |
| 2008/0294996 A1 | 11/2008 | Hunt et al. |
| 2009/0006156 A1 | 1/2009 | Hunt et al. |
| 2009/0006309 A1 | 1/2009 | Hunt et al. |
| 2009/0006788 A1 | 1/2009 | Hunt et al. |
| 2009/0012971 A1 | 1/2009 | Hunt et al. |
| 2009/0018996 A1 | 1/2009 | Hunt et al. |
| 2009/0055445 A1 | 2/2009 | Liu et al. |
| 2009/0070131 A1* | 3/2009 | Chen .................................. 705/1 |
| 2009/0083306 A1 | 3/2009 | Sichi et al. |
| 2009/0132541 A1 | 5/2009 | Barsness et al. |
| 2009/0132609 A1 | 5/2009 | Barsness et al. |
| 2009/0150428 A1 | 6/2009 | Anttila et al. |
| 2010/0070333 A1 | 3/2010 | Musa |
| 2010/0094882 A1 | 4/2010 | Lee |
| 2011/0137924 A1 | 6/2011 | Hunt et al. |

FOREIGN PATENT DOCUMENTS

| | | | |
|---|---|---|---|
| WO | WO-2008/092147 A9 | 7/2008 |
| WO | WO-2008092147 A2 | 7/2008 |

OTHER PUBLICATIONS

"U.S. Appl. No. 12/021,268, Non-Final Office Action mailed Mar. 26, 2010", , 12 pgs.

"U.S. Appl. No. 12/023,200, Non-Final Office Action mailed Jul. 24, 2009", , 32 Pgs.

"U.S. Appl. No. 12/023,283, Non-Final Office Action mailed Mar. 23, 2010", , 8 pgs.

"U.S. Appl. No. 12/023,284, Non-Final Office Action mailed Jun. 24, 2009", , 17 pgs.

"U.S. Appl. No. 12/023,294, Non-Final Office Action mailed Jun. 25, 2009", , 13 pgs.

"U.S. Appl. No. 12/023,294, Final Office Action mailed Mar. 10, 2010", , 14 pgs.

Fangyan, R. et al., "Spatial hierarchy and OLAP-favored search in spatial data warehouse", *Proceedings of the 6th ACM international workshop on Data warehousing and OLAP* New Oreleans, Louisiana, USA Nov. 7, 2003 , 12.

Inderpa, S. M. et al., "Maintenance of data cubes and summary tables in a warehouse", *Proceedings of the 1997 ACM SIGMOD interna-* tional conference on Management of data Tucson, Arizona, United States May 11-15, , p. 100-111.

Intl Searching Authority, , "International Search Report", For US Patent Application No. PCT/US2008/052187, mailed on Oct. 30, 2008.

"U.S. Appl. No. 12/023,267, Non-Final Office Action mailed Jun. 1, 2010", , 11.

"U.S. Appl. No. 12/023,283, Final Office Action mailed Nov. 12, 2010", , 12.

"U.S. Appl. No. 12/023,301, Non-Final Office Action mailed Sep. 22, 2010", , 23 pgs.

"U.S. Appl. No. 12/023,310, Non-Final Office Action mailed Sep. 22, 2010", , 19.

Chaudhuri, Surajit et al., "An overview of data warehousing and OLAP technology", Surajit Chaudhuri, Umeshwar Dayal, An overview of data warehousing and OLAP technology, *ACM SIGMOD Record*, v.26 n. 1, p. 65-74, Mar. 1997, 65-74.

Chaudhuri, S. et al., "Database technology for decision support systems", Chaudhuri, S.; Dayal, U.; ganti, V.; , "Database technology for decision support systems," *Computer*, vol. 34, No. 12, pp. 48-55, Dec. 2001.

Colliat, George , "OLAP, relational, and multidimensional database systems", George Colliat, OLAP, relational, and multidimensional database systems, *ACM SIGMOD Record*, v.25 n.3, p. 64-69, Sep. 1996, 64-69.

Kimball, Ralph et al., "Why decision support fails and how to fix it", Ralph Kimball, Kevin Strehlp, Why decision support fails and how to fix it, *ACM Record*, v.24 n.3, p. 92-97, Sep. 1995, 92-97.

"U.S. Appl. No. 12/023,267, Non-Final Office Action mailed Jun. 1, 2010", , 11 pages.

"U.S. Appl. No. 12/023,400, Non-Final Office Action mailed Aug. 11, 2010", , 8 pgs.

"U.S. Appl. No. 12/022,667 Final Office Action mailed Dec. 19, 2011", 14.

* cited by examiner

US 8,160,984 B2

SIMILARITY MATCHING OF A COMPETITOR'S PRODUCTS

CROSS-REFERENCE TO RELATED APPLICATIONS

This application claims the benefit of the following U.S. provisional applications: App. No. 60/887,573 filed on Jan. 31, 2007 and entitled "Analytic Platform," App. No. 60/891,508 filed on Feb. 24, 2007 and entitled "Analytic Platform," App. No. 60/891,936 filed on Feb. 27, 2007 and entitled "Analytic Platform," App. No. 60/952,898 filed on Jul. 31, 2007 and entitled "Analytic Platform."

This application is a continuation-in-part of U.S. application Ser. No. 12/021,263 filed on Jan. 28, 2008 and entitled "Associating a Granting Matrix with an Analytic Platform", which claims the benefit of the following U.S. provisional applications: App. No. 60/886,798 filed on Jan. 26, 2007 and entitled "A Method of Aggregating Data," App. No. 60/886,801 filed on Jan. 26, 2007 and entitled "Utilizing Aggregated Data."

Each of the above applications is incorporated by reference herein in its entirety.

BACKGROUND

1. Field

This invention relates to methods and systems for analyzing data, and more particularly to methods and systems for aggregating, projecting, and releasing data.

2. Description of Related Art

Currently, there exists a large variety of data sources, such as census data or movement data received from point-of-sale terminals, sample data received from manual surveys, panel data obtained from the inputs of consumers who are members of panels, fact data relating to products, sales, and many other facts associated with the sales and marketing efforts of an enterprise, and dimension data relating to dimensions along which an enterprise wishes to understand data, such as in order to analyze consumer behaviors, to predict likely outcomes of decisions relating to an enterprise's activities, and to project from sample sets of data to a larger universe. Conventional methods of synthesizing, aggregating, and exploring such a universe of data comprise techniques such as OLAP, which fix aggregation points along the dimensions of the universe in order to reduce the size and complexity of unified information sets such as OLAP stars. Exploration of the unified information sets can involve run-time queries and query-time projections, both of which are constrained in current methods by a priori decisions that must be made to project and aggregate the universe of data. In practice, going back and changing the a priori decisions can lift these constraints, but this requires an arduous and computationally complex restructuring and reprocessing of data.

According to current business practices, unified information sets and results drawn from such information sets can be released to third parties according to so-called "releasability" rules. Theses rules might apply to any and all of the data from which the unified information sets are drawn, the dimensions (or points or ranges along the dimensions), the third party (or members or sub-organizations of the third party), and so on. Given this, there can be a complex interaction between the data, the dimensions, the third party, the releasability rules, the levels along the dimensions at which aggregations are performed, the information that is drawn from the unified information sets, and so on. In practice, configuring a system to apply the releasability rules is an error-prone process that requires extensive manual set up and results in a brittle mechanism that cannot adapt to on-the-fly changes in data, dimensions, third parties, rules, aggregations, projections, user queries, and so on.

Various projection methodologies are known in the art. Still other projection methodologies are subjects of the present invention. In any case, different projection methodologies provide outputs that have different statistical qualities. Analysts are interested in specifying the statistical qualities of the outputs at query-time. In practice, however, the universe of data and the projection methodologies that are applied to it are what drive the statistical qualities. Existing methods allow an analyst to choose a projection methodology and thereby affect the statistical qualities of the output, but this does not satisfy the analyst's desire to directly dictate the statistical qualities.

Information systems are a significant bottle neck for market analysis activities. The architecture of information systems is often not designed to provide on-demand flexible access, integration at a very granular level, or many other critical capabilities necessary to support growth. Thus, information systems are counter-productive to growth. Hundreds of market and consumer databases make it very difficult to manage or integrate data. For example, there may be a separate database for each data source, hierarchy, and other data characteristics relevant to market analysis. Different market views and product hierarchies proliferate among manufacturers and retailers. Restatements of data hierarchies waste precious time and are very expensive. Navigation from among views of data, such as from global views to regional to neighborhood to store views is virtually impossible, because there are different hierarchies used to store data from global to region to neighborhood to store-level data. Analyses and insights often take weeks or months, or they are never produced. Insights are often sub-optimal because of silo-driven, narrowly defined, ad hoc analysis projects. Reflecting the ad hoc nature of these analytic projects are the analytic tools and infrastructure developed to support them. Currently, market analysis, business intelligence, and the like often use rigid data cubes that may include hundreds of databases that are impossible to integrate. These systems may include hundreds of views, hierarchies, clusters, and so forth, each of which is associated with its own rigid data cube. This may make it almost impossible to navigate from global uses that are used, for example, to develop overall company strategy, down to specific program implementation or customer-driven uses. These ad hoc analytic tools and infrastructure are fragmented and disconnected.

In sum, there are many problems associated with the data used for market analysis, and there is a need for a flexible, extendable analytic platform, the architecture for which is designed to support a broad array of evolving market analysis needs. Furthermore, there is a need for better business intelligence in order to accelerate revenue growth, make business intelligence more customer-driven, to gain insights about markets in a more timely fashion, and a need for data projection and release methods and systems that provide improved dimensional flexibility, reduced query-time computational complexity, automatic selection and blending of projection methodologies, and flexibly applied releasability rules.

SUMMARY

In embodiments, systems and methods may involve using a platform as disclosed herein for applications described herein where the systems and methods involve identifying a classification scheme associated with product attributes of a grouping of products of an entity. It may also involve receiving a record of data relating to an item of a competitor to the entity, the classification of which is uncertain. It may also involve receiving a dictionary of attributes associated with products. It may also involve assigning a product code to the item, based on probabilistic matching among the attributes in the classification scheme, the attributes in the dictionary of attributes and at least one known attribute of the item.

In embodiments, the product attribute may be a nutritional level, a brand, a product category, a physical attribute, may be based on one or more part of a stock keeping unit (SKU) or some other type of product attribute. For example, a product attribute may be 'Reebok'. In this case, the product attribute is a brand. The product attributes may be provided by a similarity facility. The similarity facility may associate each attribute with a weight for probabilistic matching.

In embodiments, the product attribute may be the physical attribute. The physical attribute may be a flavor, a scent, packaging type, a product launch type, display location or some other type of physical attribute. For example, the packaging type may be 'hard bound' or 'paperback' in case of a book.

These and other systems, methods, objects, features, and advantages of the present invention will be apparent to those skilled in the art from the following detailed description of the preferred embodiment and the drawings. Capitalized terms used herein (such as relating to titles of data objects, tables, or the like) should be understood to encompass other similar content or features performing similar functions, except where the context specifically limits such terms to the use herein.

BRIEF DESCRIPTION OF THE FIGURES

The invention and the following detailed description of certain embodiments thereof may be understood by reference to the following figures.

DETAILED DESCRIPTION

Figure 1:
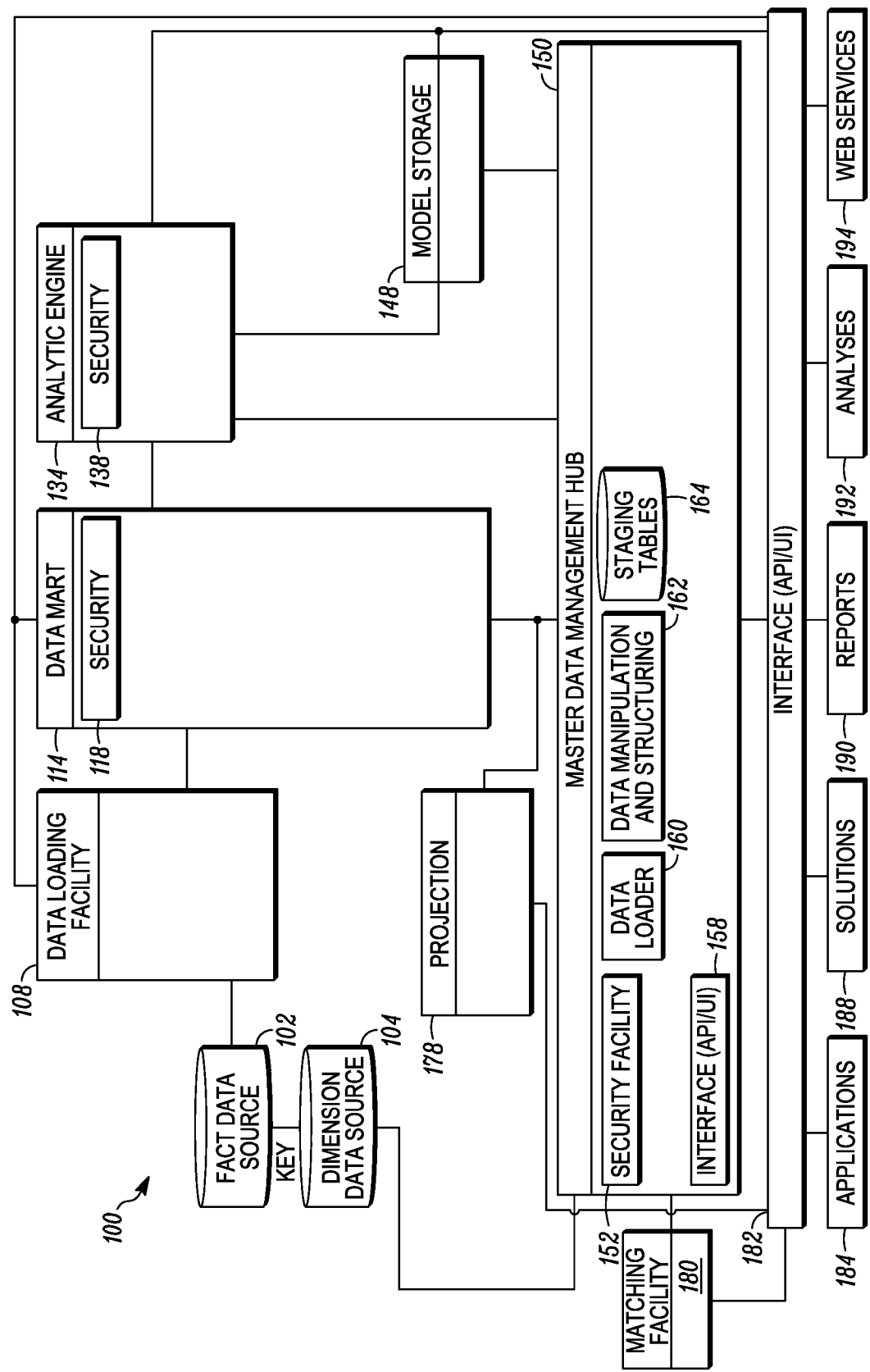
FIG. 1 illustrates an analytic platform for performing data analysis.

Referring to FIG. 1, the methods and systems disclosed herein are related to improved methods for handling and using data and metadata for the benefit of an enterprise. An analytic platform 100 may support and include such improved methods and systems. The analytic platform 100 may include, in certain embodiments, a range of hardware systems, software modules, data storage facilities, application programming interfaces, human-readable interfaces, and methodologies, as well as a range of applications, solutions, products, and methods that use various outputs of the analytic platform 100, as more particularly detailed herein, other embodiments of which would be understood by one of ordinary skill in the art and are encompassed herein. Among other components, the analytic platform 100 includes methods and systems for providing various representations of data and metadata, methodologies for acting on data and metadata, an analytic engine, and a data management facility that is capable of handling disaggregated data and performing aggregation, calculations, functions, and real-time or quasi-real-time projections. In certain embodiments, the methods and systems enable much more rapid and flexible manipulation of data sets, so that certain calculations and projections can be done in a fraction of the time as compared with older generation systems.

In embodiments, data compression and aggregations of data, such as fact data sources 102, and dimension data sources 104, may be performed in conjunction with a user query such that the aggregation dataset can be specifically generated in a form most applicable for generating calculations and projections based on the query. In embodiments, data compression and aggregations of data may be done prior to, in anticipation of, and/or following a query. In embodiments, an analytic platform 100 (described in more detail below) may calculate projections and other solutions dynamically and create hierarchical data structures with custom dimensions that facilitate the analysis. Such methods and systems may be used to process point-of-sale (POS) data, retail information, geography information, causal information, survey information, census data and other forms of data and forms of assessments of past performance (e.g. estimating the past sales of a certain product within a certain geographical region over a certain period of time) or projections of future results (e.g. estimating the future or expected sales of a certain product within a certain geographical region over a certain period of time). In turn, various estimates and projections can be used for various purposes of an enterprise, such as relating to purchasing, supply chain management, handling of inventory, pricing decisions, the planning of promotions, marketing plans, financial reporting, and many others.

Referring still to FIG. 1 an analytic platform 100 is illustrated that may be used to analyze and process data in a disaggregated or aggregated format, including, without limitation, dimension data defining the dimensions along which various items are measured and factual data about the facts that are measured with respect to the dimensions. Factual data may come from a wide variety of sources and be of a wide range of types, such as traditional periodic point-of-sale (POS) data, causal data (such as data about activities of an enterprise, such as in-store promotions, that are posited to cause changes in factual data), household panel data, frequent shopper program information, daily, weekly, or real time POS data, store database data, store list files, stubs, dictionary data, product lists, as well as custom and traditional audit data. Further extensions into transaction level data, RFID data and data from non-retail industries may also be processed according to the methods and systems described herein.

In embodiments, a data loading facility 108 may be used to extract data from available data sources and load them to or within the analytic platform 100 for further storage, manipulation, structuring, fusion, analysis, retrieval, querying and other uses. The data loading facility 108 may have the a plurality of responsibilities that may include eliminating data for non-releasable items, providing correct venue group flags for a venue group, feeding a core information matrix with relevant information (such as and without limitation statistical metrics), or the like. In an embodiment, the data loading facility 108 eliminate non-related items. Available data sources may include a plurality of fact data sources 102 and a plurality of dimension data sources 104. Fact data sources 102 may include, for example, facts about sales volume, dollar sales, distribution, price, POS data, loyalty card transaction files, sales audit files, retailer sales data, and many other fact data sources 102 containing facts about the sales of the enterprise, as well as causal facts, such as facts about activities of the enterprise, in-store promotion audits, electronic pricing and/or promotion files, feature ad coding files, or others that tend to influence or cause changes in sales or other events, such as facts about in-store promotions, advertising, incentive programs, and the like. Other fact data sources may include custom shelf audit files, shipment data files, media data files, explanatory data (e.g., data regarding weather), attitudinal data, or usage data. Dimension data sources 104 may include information relating to any dimensions along which an enterprise wishes to collect data, such as dimensions relating to products sold (e.g. attribute data relating to the types of products that are sold, such as data about UPC codes, product hierarchies, categories, brands, sub-brands, SKUs and the like), venue data (e.g. store, chain, region, country, etc.), time data (e.g. day, week, quad-week, quarter, 12-week, etc.), geographic data (including breakdowns of stores by city, state, region, country or other geographic groupings), consumer or customer data (e.g. household, individual, demographics, household groupings, etc.), and other dimension data sources 104. While embodiments disclosed herein relate primarily to the collection of sales and marketing-related facts and the handling of dimensions related to the sales and marketing activities of an enterprise, it should be understood that the methods and systems disclosed herein may be applied to facts of other types and to the handling of dimensions of other types, such as facts and dimensions related to manufacturing activities, financial activities, information technology activities, media activities, supply chain management activities, accounting activities, political activities, contracting activities, and many others.

In an embodiment, the analytic platform 100 comprises a combination of data, technologies, methods, and delivery mechanisms brought together by an analytic engine. The analytic platform 100 may provide a novel approach to managing and integrating market and enterprise information and enabling predictive analytics. The analytic platform 100 may leverage approaches to representing and storing the base data so that it may be consumed and delivered in real-time, with flexibility and open integration. This representation of the data, when combined with the analytic methods and techniques, and a delivery infrastructure, may minimize the processing time and cost and maximize the performance and value for the end user. This technique may be applied to problems where there may be a need to access integrated views across multiple data sources, where there may be a large multi-dimensional data repository against which there may be a need to rapidly and accurately handle dynamic dimensionality requests, with appropriate aggregations and projections, where there may be highly personalized and flexible real-time reporting 190, analysis 192 and forecasting capabilities required, where there may be a need to tie seamlessly and on-the-fly with other enterprise applications 184 via web services 194 such as to receive a request with specific dimensionality, apply appropriate calculation methods, perform and deliver an outcome (e.g. dataset, coefficient, etc.), and the like.

The analytic platform 100 may provide innovative solutions to application partners, including on-demand pricing insights, emerging category insights, product launch management, loyalty insights, daily data out-of-stock insights, assortment planning, on-demand audit groups, neighborhood insights, shopper insights, health and wellness insights, consumer tracking and targeting, and the like.

A decision framework may enable new revenue and competitive advantages to application partners by brand building, product innovation, consumer-centric retail execution, consumer and shopper relationship management, and the like. Predictive planning and optimization solutions, automated analytics and insight solutions, and on-demand business performance reporting may be drawn from a plurality of sources, such as InfoScan, total C-scan, daily data, panel data, retailer direct data, SAP, consumer segmentation, consumer demographics, FSP/loyalty data, data provided directly for customers, or the like.

The analytic platform 100 may have advantages over more traditional federation/consolidation approaches, requiring fewer updates in a smaller portion of the process. The analytic platform 100 may support greater insight to users, and provide users with more innovative applications. The analytic platform 100 may provide a unified reporting and solutions framework, providing on-demand and scheduled reports in a user dashboard with summary views and graphical dial indicators, as well as flexible formatting options. Benefits and products of the analytic platform 100 may include non-additive measures for custom product groupings, elimination of restatements to save significant time and effort, cross-category visibility to spot emerging trends, provide a total market picture for faster competitor analysis, provide granular data on demand to view detailed retail performance, provide attribute driven analysis for market insights, and the like.

The analytic capabilities of the present invention may provide for on-demand projection, on-demand aggregation, multi-source master data management, and the like. On-demand projection may be derived directly for all possible geographies, store and demographic attributes, per geography or category, with built-in dynamic releasability controls, and the like. On-demand aggregation may provide both additive and non-additive measures, provide custom groups, provide cross-category or geography analytics, and the like. Multi-source master data management may provide management of dimension member catalogue and hierarchy attributes, processing of raw fact data that may reduce harmonization work to attribute matching, product and store attributes stored relationally, with data that may be extended independently of fact data, and used to create additional dimensions, and the like.

In addition, the analytic platform 100 may provide flexibility, while maintaining a structured user approach. Flexibility may be realized with multiple hierarchies applied to the same database, the ability to create new custom hierarchies and views, rapid addition of new measures and dimensions, and the like. The user may be provided a structured approach through publishing and subscribing reports to a broader user base, by enabling multiple user classes with different privileges, providing security access, and the like. The user may also be provided with increased performance and ease of use, through leading-edge hardware and software, and web application for integrated analysis.

In embodiments, the data available within a fact data source 102 and a dimension data source 104 may be linked, such as through the use of a key. For example, key-based fusion of fact 102 and dimension data 104 may occur by using a key, such as using the Abilitec Key software product offered by Acxiom, in order to fuse multiple sources of data. For example, such a key can be used to relate loyalty card data (e.g., Grocery Store 1 loyalty card, Grocery Store 2 loyalty card, and Convenience Store 1 loyalty card) that are available for a single customer, so that the fact data from multiple sources can be used as a fused data source for analysis on desirable dimensions. For example, an analyst might wish to view time-series trends in the dollar sales allotted by the customer to each store within a given product category.

In embodiments the data loading facility may comprise any of a wide range of data loading facilities, including or using suitable connectors, bridges, adaptors, extraction engines, transformation engines, loading engines, data filtering facilities, data cleansing facilities, data integration facilities, or the like, of the type known to those of ordinary skill in the art. In various embodiments, there are many situations where a store will provide POS data and causal information relating to its store. For example, the POS data may be automatically transmitted to the facts database after the sales information has been collected at the stores POS terminals. The same store may also provide information about how it promoted certain products, its store or the like. This data may be stored in another database; however, this causal information may provide one with insight on recent sales activities so it may be used in later sales assessments or forecasts. Similarly, a manufacturer may load product attribute data into yet another database and this data may also be accessible for sales assessment or projection analysis. For example, when making such analysis one may be interested in knowing what categories of products sold well or what brand sold well. In this case, the causal store information may be aggregated with the POS data and dimension data corresponding to the products referred to in the POS data. With this aggregation of information one can make an analysis on any of the related data.

Referring still to FIG. 1, data that is obtained by the data loading facility 108 may be transferred to a plurality of facilities within the analytic platform 100, including the data mart 114. In embodiments the data loading facility 108 may contain one or more interfaces 182 by which the data loaded by the data loading facility 108 may interact with or be used by other facilities within the platform 100 or external to the platform. Interfaces to the data loading facility 108 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data loading facility 108. The interfaces 182 may support interactions with the data loading facility 108 by applications 184, solutions 188, reporting facilities 190, analyses facilities 192, services 194 or other entities, external to or internal to an enterprise. In embodiments these interfaces are associated with interfaces 182 to the platform 100, but in other embodiments direct interfaces may exist to the data loading facility 108, either by other components of the platform 100, or by external entities.

Referring still to FIG. 1, in embodiments the data mart facility 114 may be used to store data loaded from the data loading facility 108 and to make the data loaded from the data loading facility 108 available to various other entities in or external to the platform 100 in a convenient format. Within the data mart 114 facilities may be present to further store, manipulate, structure, subset, merge, join, fuse, or perform a wide range of data structuring and manipulation activities. The data mart facility 114 may also allow storage, manipulation and retrieval of metadata, and perform activities on metadata similar to those disclosed with respect to data. Thus, the data mart facility 114 may allow storage of data and metadata about facts (including sales facts, causal facts, and the like) and dimension data, as well as other relevant data and metadata. In embodiments, the data mart facility 114 may compress the data and/or create summaries in order to facilitate faster processing by other of the applications 184 within the platform 100 (e.g. the analytic server 134). In embodiments the data mart facility 114 may include various methods, components, modules, systems, sub-systems, features or facilities associated with data and metadata.

In certain embodiments the data mart facility 114 may contain one or more interfaces 182 (not shown on FIG. 1), by which the data loaded by the data mart facility 114 may interact with or be used by other facilities within the platform 100 or external to the platform. Interfaces to the data mart facility 114 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data mart facility 114. These interfaces may comprise interfaces 182 to the platform 100 as a whole, or may be interfaces associated directly with the data mart facility 114 itself, such as for access from other components of the platform 100 or for access by external entities directly to the data mart facility 1 14. The interfaces 182 may support interactions with the data mart facility 114 by applications 184, solutions 188, reporting facilities 190, analyses facilities 192, services 194 (each of which is describe in greater detail herein) or other entities, external to or internal to an enterprise.

In certain optional embodiments, the security facility 118 may be any hardware or software implementation, process, procedure, or protocol that may be used to block, limit, filter or alter access to the data mart facility 114, and/or any of the facilities within the data mart facility 114, by a human operator, a group of operators, an organization, software program, bot, virus, or some other entity or program. The security facility 118 may include a firewall, an anti-virus facility, a facility for managing permission to store, manipulate and/or retrieve data or metadata, a conditional access facility, a logging facility, a tracking facility, a reporting facility, an asset management facility, an intrusion-detection facility, an intrusion-prevention facility or other suitable security facility.

Still referring to FIG. 1, the analytic platform 100 may include an analytic engine 134. The analytic engine 134 may be used to build and deploy analytic applications or solutions or undertake analytic methods based upon the use of a plurality of data sources and data types. Among other things, the analytic engine 134 may perform a wide range of calculations and data manipulation steps necessary to apply models, such as mathematical and economic models, to sets of data, including fact data, dimension data, and metadata. The analytic engine 134 may be associated with an interface 182, such as any of the interfaces described herein.

The analytic engine 134 may interact with a model storage facility 148, which may be any facility for generating models used in the analysis of sets of data, such as economic models, econometric models, forecasting models, decision support models, estimation models, projection models, and many others. In embodiments output from the analytic engine 134 may be used to condition or refine models in the model storage 148; thus, there may be a feedback loop between the two, where calculations in the analytic engine 134 are used to refine models managed by the model storage facility 148.

In embodiments, a security facility 138 of the analytic engine 134 may be the same or similar to the security facility 118 associated with the data mart facility 114, as described herein. Alternatively, the security facility 138 associated with the analytic engine 134 may have features and rules that are specifically designed to operate within the analytic engine 134.

As illustrated in FIG. 1, the analytic platform 100 may contain a master data management hub 150 (MDMH). In embodiments the MDMH 150 may serve as a central facility for handling dimension data used within the analytic platform 100, such as data about products, stores, venues, geographies, time periods and the like, as well as various other dimensions relating to or associated with the data and metadata types in the data sources 102, 104, the data loading facility 108, the data mart facility 114, the analytic engine 134, the model storage facility 148 or various applications, 184, solutions 188, reporting facilities 190, analytic facilities 192 or services 194 that interact with the analytic platform 100. The MDMH 150 may in embodiments include a security facility 152, an interface 158, a data loader 160, a data manipulation and structuring facility 162, and one or more staging tables 164. The data loader 160 may be used to receive data. Data may enter the MDMH from various sources, such as from the data mart 114 after the data mart 114 completes its intended processing of the information and data that it received as described herein. Data may also enter the MDMH 150 through a user interface 158, such as an API or a human user interface, web browser or some other interface, of any of the types disclosed herein or in the documents incorporated by reference herein. The user interface 158 may be deployed on a client device, such as a PDA, personal computer, laptop computer, cellular phone, or some other client device capable of handling data. In embodiments, the staging tables 164 may be included in the MDMH 150.

In embodiments, a matching facility 180 may be associated with the MDMH 150. The matching facility 180 may receive an input data hierarchy within the MDMH 150 and analyze the characteristics of the hierarchy and select a set of attributes that are salient to a particular analytic interest (e.g., product selection by a type of consumer, product sales by a type of venue, and so forth). The matching facility 180 may select primary attributes, match attributes, associate attributes, block attributes and prioritize the attributes. The matching facility 180 may associate each attribute with a weight and define a set of probabilistic weights. The probabilistic weights may be the probability of a match or a non-match, or thresholds of a match or non-match that is associated with an analytic purpose (e.g., product purchase). The probabilistic weights may then be used in an algorithm that is run within a probabilistic matching engine (e.g., IBM QualityStage). The output of the matching engine may provide information on, for example, other products which are appropriate to include in a data hierarchy, the untapped market (i.e. other venues) in which a product is probabilistically more likely to sell well, and so forth. In embodiments, the matching facility 180 may be used to generate projections of what types of products, people, customers, retailers, stores, store departments, etc. are similar in nature and therefore they may be appropriate to combine in a projection or an assessment.

As illustrated in FIG. 1, the analytic platform 100 may include a projection facility 178. A projection facility 178 may be used to produce projections, whereby a partial data set (such as data from a subset of stores of a chain) is projected to a universe (such as all of the stores in a chain), by applying appropriate weights to the data in the partial data set. A wide range of potential projection methodologies exist, including cell-based methodologies, store matrix methodologies, iterative proportional fitting methodologies, virtual census methodologies, and others. The methodologies can be used to generate projection factors. As to any given projection, there is typically a tradeoff among various statistical quality measurements associated with that type of projection. Some projections are more accurate than others, while some are more consistent, have less spillage, are more closely calibrated, or have other attributes that make them relatively more or less desirable depending on how the output of the projection is likely to be used. In embodiments of the platform 100, the projection facility 178 takes dimension information from the MDMH 150 or from another source and provides a set of projection weightings along the applicable dimensions, typically reflected in a matrix of projection weights, which can be applied at the data mart facility 114 to a partial data set in order to render a projected data set. The projection facility 178 may have an interface 182 of any of the types disclosed herein.

As shown in FIG. 1, an interface 182 may be included in the analytic platform 100. In embodiments, data may be transferred to the MDMH 150 of the platform 100 using a user interface 182. The interface 182 may be a web browser operating over the Internet or within an intranet or other network, it may be an analytic engine 134, an application plug-in, or some other user interface that is capable of handling data. The interface 182 may be human readable or may consist of one or more application programming interfaces, or it may include various connectors, adaptors, bridges, services, transformation facilities, extraction facilities, loading facilities, bindings, couplings, or other data integration facilities, including any such facilities described herein or in documents incorporated by reference herein.

As illustrated in FIG. 1, the platform 100 may interact with a variety of applications 184, solutions 188, reporting facilities 190, analytic facilities 192 and services 194, such as web services, or with other platforms or systems of an enterprise or external to an enterprise. Any such applications 184, solutions 188, reporting facilities 190, analytic facilities 192 and services 194 may interact with the platform 100 in a variety of ways, such as providing input to the platform 100 (such as data, metadata, dimension information, models, projections, or the like), taking output from the platform 100 (such as data, metadata, projection information, information about similarities, analytic output, output from calculations, or the like), modifying the platform 100 (including in a feedback or iterative loop), being modified by the platform 100 (again optionally in a feedback or iterative loop), or the like.

In embodiments one or more applications 184 or solutions 188 may interact with the platform 100 via an interface 182. Applications 184 and solutions 188 may include applications and solutions (consisting of a combination of hardware, software and methods, among other components) that relate to planning the sales and marketing activities of an enterprise, decision support applications, financial reporting applications, applications relating to strategic planning, enterprise dashboard applications, supply chain management applications, inventory management and ordering applications, manufacturing applications, customer relationship management applications, information technology applications, applications relating to purchasing, applications relating to pricing, promotion, positioning, placement and products, and a wide range of other applications and solutions.

In embodiments, applications 184 and solutions 188 may include analytic output that is organized around a topic area. For example, the organizing principle of an application 184 or a solution 188 may be a new product introduction. Manufacturers may release thousands of new products each year. It may be useful for an analytic platform 100 to be able to group analysis around the topic area, such as new products, and organize a bundle of analyses and workflows that are presented as an application 184 or solution 188. Applications 184 and solutions 188 may incorporate planning information, forecasting information, "what if?" scenario capability, and other analytic features. Applications 184 and solutions 188 may be associated with web services 194 that enable users within a client's organization to access and work with the applications 184 and solutions 188.

In embodiments, the analytic platform 100 may facilitate delivering information to external applications 184. This may include providing data or analytic results to certain classes of applications 184. For example and without limitation, an application may include enterprise resource planning/backbone applications 184 such as SAP, including those applications 184 focused on Marketing, Sales & Operations Planning and Supply Chain Management. In another example, an application may include business intelligence applications 184, including those applications 184 that may apply data mining techniques. In another example, an application may include customer relationship management applications 184, including customer sales force applications 184. In another example, an application may include specialty applications 184 such as a price or SKU optimization application. The analytic platform 100 may facilitate supply chain efficiency applications 184. For example and without limitation, an application may include supply chain models based on sales out (POS/FSP) rather than sales in (Shipments). In another example, an application may include RFID based supply chain management. In another example, an application may include a retailer co-op to enable partnership with a distributor who may manage collective stock and distribution services. The analytic platform 100 may be applied to industries characterized by large multi-dimensional data structures. This may include industries such as telecommunications, elections and polling, and the like. The analytic platform 100 may be applied to opportunities to vend large amounts of data through a portal with the possibility to deliver highly customized views for individual users with effectively controlled user accessibility rights. This may include collaborative groups such as insurance brokers, real estate agents, and the like. The analytic platform 100 may be applied to applications 184 requiring self monitoring of critical coefficients and parameters. Such applications 184 may rely on constant updating of statistical models, such as financial models, with real-time flows of data and ongoing re-calibration and optimization. The analytic platform 100 may be applied to applications 184 that require breaking apart and recombining geographies and territories at will.

In embodiments, a matching facility 180 may be a similarity facility 180 may be associated with the MDMH 150. The similarity facility 180 may receive an input data hierarchy within the MDMH 150 and analyze the characteristics of the hierarchy and select a set of attributes that are salient to a particular analytic interest (e.g., product selection by a type of consumer, product sales by a type of venue, and so forth). The similarity facility 180 may select primary attributes, match attributes, associate attributes, block attributes and prioritize the attributes. The similarity facility 180 may associate each attribute with a weight and define a set of probabilistic weights. The probabilistic weights may be the probability of a match or a non-match, or thresholds of a match or non-match that is associated with an analytic purpose (e.g., product purchase). The probabilistic weights may then be used in an algorithm that is run within a probabilistic matching engine (e.g., IBM QualityStage). The output of the matching engine may provide information on, for example, other products which are appropriate to include in a data hierarchy, the untapped market (i.e. other venues) in which a product is probabilistically more likely to sell well, and so forth. In embodiments, the similarity facility 180 may be used to generate projections of what types of products, people, customers, retailers, stores, store departments, etc. are similar in nature and therefore they may be appropriate to combine in a projection or an assessment.

In embodiments, the MDMH 150 may accommodate a blend of disaggregated and pre-aggregated data as necessitated by a client's needs. For example, a client in the retail industry may have a need for a rolling, real-time assessment of store performance within a sales region. The ability of the MDMH 150 to accommodate twinkle data, and the like may give the client useful insights into disaggregated sales data as it becomes available and make it possible to create projections based upon it and other available data. At the same time, the client may have pre-aggregated data available for use, for example a competitor's sales data, economic indicators, inventory, or some other dataset. The MDMH 150 may handle the dimension data needed to combine the use of these diverse data sets.

Figure 2:
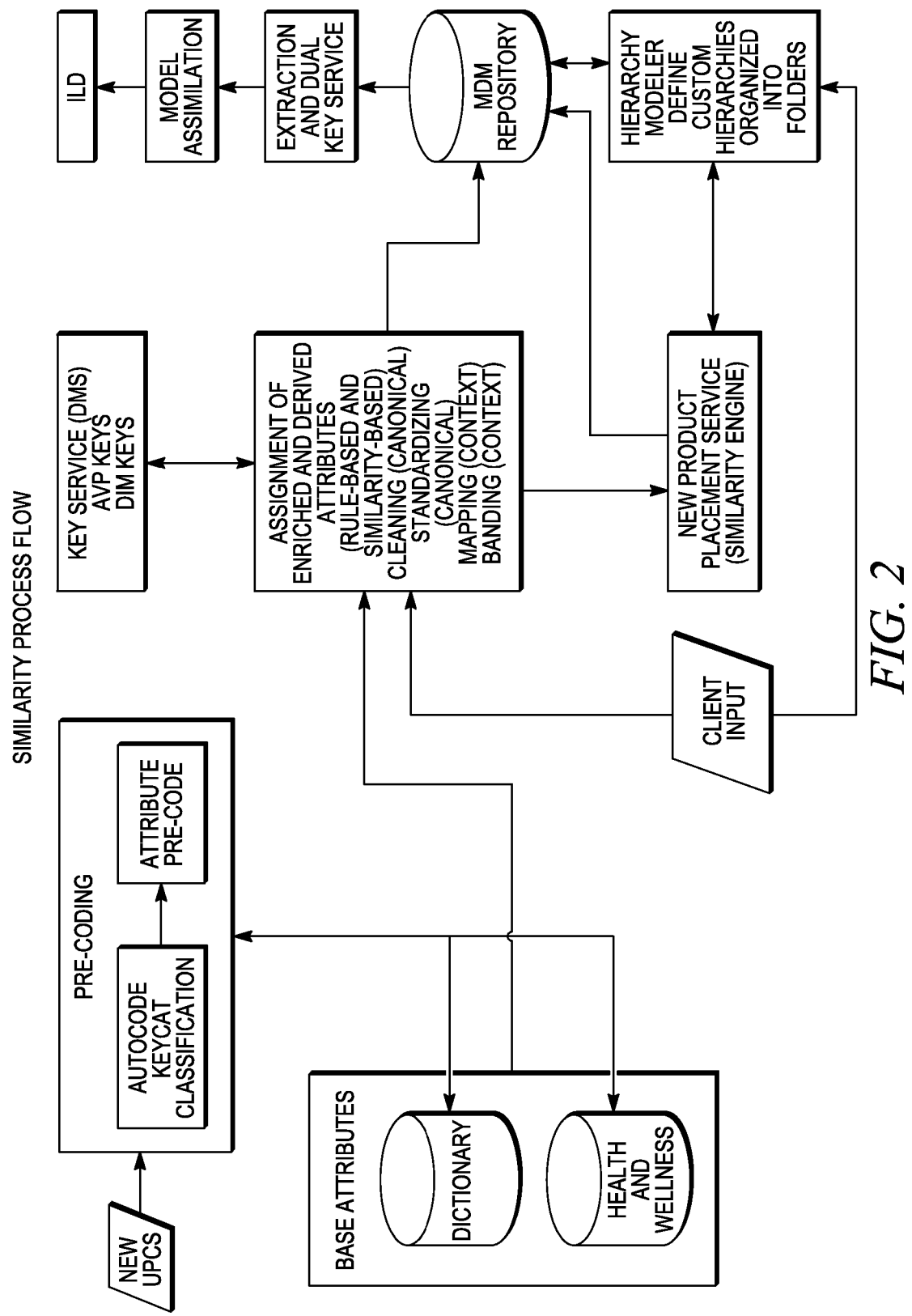
FIG. 2 depicts a similarities matching process.

Referring to FIG. 1 and FIG. 2, several types of data management challenges may be grouped into a class of problems known as similarity; which may be described as the problem of finding the commonalities or similarities within data structures. While there may be situations where data comparisons, fusions, combinations, aggregations and the like can be made directly (e.g. through an explicit reference to the same item name) there are many situations where there exist two things that are characterized by various attributes but where the attributes do not match. In such situations, in certain embodiments, a similarities facility 180 may be used to determine if the characteristics (e.g. the identified attributes in a fact or dimensions database) of the two things are close enough for the things to be called "similar." In embodiments, the similarities facility 180 may use a probabilistic based methodology for the determination of similarity. The probabilistic methodology may use input (e.g. user input or API input) to determine if the two things are similar within a certain degree of confidence and/or the probabilistic methodology may produce an indication of how likely the two things are to be similar. There are many processes that can be performed on the data once two or more things are determined to be similar. For example, data associated with the two things may be aggregated or fused together such that the information pertaining to the two things can be used as a projection of one whole. In certain embodiments, the similarity information may be used to generate new attributes or other descriptions to be associated with the thing being analyzed. For example, once a certain product is identified as similar to a certain class of products, data indicating such may be associated with the certain product. New attribute data may be associated with an item and the information may be loaded into a dimensions database such that data associated with the item, and the item itself, can be used in projections or assessments.

A similarities facility 180 according to the principles of the present invention may be used to assess the similarity of products, items, departments, stores, environments, real estate, competitors, markets, regions, performance, regional performance, and a variety of other things. For example, in the management of retail market information, the similarity problem may manifest itself as a need to identify similar stores for purposes of projecting regional performance from a sample of, as the need to identify the competing or comparison set of products for any given item; as the need to identify similar households for purposes of bias correction; as the need to properly place new or previously unclassified or reclassified items in a product hierarchy; or for other projections and assessments. In another example, again from the retail industry, automated item placement may pose a problem. Often the current solution is labor intensive and may take from eight to twelve weeks for a new product to get properly placed within a store, department, shelf or otherwise. This delay inhibits the effectiveness of the analysis of new product introductions and in the tactical monitoring of category areas for a daily data service. However, these application sets need the product list to be up to date. In addition, the management of custom retail hierarchies may require that items from all other retailers in the market be placed inside that hierarchy, and often the structure of that hierarchy is not based on existing attributes. This may mean that the logic of the hierarchy itself must be discovered and then all other items from the market must be 'similarly' organized. In the current environment, this process takes months and is prone to error. In embodiments of the present invention, issues of similarity are automated using techniques such as rules-based matching, algorithmic matching, and other similarities methods. In the present example, the similarities facility 180 may be used to assess the similarity of the new product with existing products to determine placement information. Once the similar matches are made, new attributes may be added to the new product description such that it is properly grouped physically in the store and electronically within the data structures to facilitate proper assessments and projections.

The similarity of entities may be associated with the concept of grouping entities for the purpose of reporting. One purpose may be to codify the rules placing entities into a specific classification definition. Some examples of such specific classification definitions may be item similarity for use in automatic classification and hierarchy, venue similarity for use in projections and imputations, consumer similarity in areas like ethnicity and economics used for developing weighting factors, or the like.

There may be certain matching requirements used by the similarities facility 180 in the determination of similarity. For example, scenarios for matching similarity may involve determining similar items related to a single specified item, where the similarities engine is programmed to identify all the items in the repository that are similar to it with respect to some specific criteria (e.g. one or more attributes listed in the dimensions database). The similarities engine may also or instead be programmed to analyze a list of items, where all the items in the repository are similar to each of the items in the list with respect to some specific criteria. Likewise, the similarities facility 180 may analyze an item within a list of items, where group items are placed into classifications of similar items with respect to some specific criteria; or the like.

In embodiments, the similarities facility 180 may use a probabilistic matching engine where the probabilistic matching engine compares all or some subset of attributes to determine the similarity. Each of the attributes may be equally considered in the probabilistic evaluation or certain attributes may be weighted with greater relevance. The similarities facility 180 may select certain attributes to weigh with greater relevance and/or it may receive input to determine which attributes to weight. For example, the similarities engine may automatically select and disproportionately weight the attributes associated with 'scent' when assessing the products that it understands to be deodorants. In other embodiments, a user may determine which attributes or fields to disproportionally weight. For example, a user may determine a priority for the weighting of certain attributes (e.g. attributes within a list of attributes identified in a dimensions database), and load the prioritization, weighting or other such information into the similarities facility 180. The similarities facility 180 may then run a probabilistic matching engine with the weights as a factor in determining the extent to which things are similar.

An advantage of using probabilistic matching for doing similarity may be related to an unduplication process. The matching for unduplication and similarity may be similar. However, they may be based on different sets of attributes. For unduplication, all attributes may be used since the system may be looking for an exact match or duplicate item. This may work by matching a list against itself. In similarity, the system may be looking for items that are similar with regard to physical attributes, not the same exact item.

For two entities to be similar, they may have to be evaluated by a specific similarity measure. In most cases, they may have to be in the same domain, but this also may depend on the similarity measure that is used. The similarity measure that the system may use is the probabilistic matching of physical attributes of items, such as a deodorant keycat (or deodorant "key category"), where a keycat is a block of items that have a similar set of attributes. In this case, since the item may be a domain, and venue is a domain, an item may not be looked at as being similar to a venue.

The concept of similarity may be based on the similarity of the values of attributes that describe specific entities. This may involve developing similarity measures and the metadata to support them. The process may include deciding the purpose of the similarity; selecting the set of entities to be used in the similarity process; analyzing the characteristics (attributes and values) of each entity in the set of possible similar entities; deciding which attributes will be used as part of the similarity measure; deciding on the priority and weight of the set of attributes and their values; defining the similarity measure; defining all the probabilistic weights needed to perform the similarity measure; defining the thresholds, such as automatic definite match, automatic definite non-match, or undecided match with human intervention; or the like.

The measure used may be the probabilistic matching of certain physical attributes. This may be associated with automatic record linkage. Types of matching may include individual matching that may be used for the single item scenario, where one file contains a single item and a second file contains a the master list of deodorants; many-to-one matching that may be a one-to-many matching of individual records from one file to a second file; single file grouping that may be for grouping similar items in a single list; geographic coding that may insert missing information from one file into a second file when there is a match, useful for adding new attribute information from external examples to the repository that does not currently exist; unduplication service that may identify duplicate items in a single list; or the like.

Weighting factors of each attribute and of the total composite weight of the match may be important aspects to take into account in the matching process. Since the system may use probabilistic matching, the frequency analysis of each of the attribute values may be taken into account. The weight of the match of a specific attribute may be computed as the logarithm to the base two of the ratio of m and u, where the m probability is the probability that a field agrees given that the record pair being examined is a matched pair, which may be one minus the error rate of the field, and the u probability is the probability that a field agrees given that the record pair being examined is an unmatched pair, which may be the probability that the field agrees at random. The composite weight of the match, also referred to as match weight, may be the sum of each of the matched attribute weights. Each matched attribute may then be computed. If two attributes do not match, the disagreement weight may be calculated as: $\log_2[(1-m)/(1-u)]$. Each time a match is accomplished, a match weight may also be calculated. Thresholds may be established to decide if this is a good match, a partial match, or not a match at all.

When doing probabilistic matching, different types of attributes may be needed, such as block attributes and match attributes. In this instance, block attributes may divide a list of items into blocks. This may provide a better performance on the matching. The block attributes may have to match before the block of items is examined. Two keycats may have similar attributes with different sets of attribute values. A value may be the information stored in a value fact of an attribute. There may be different types of attributes, such as global attributes across all keycats, keycat specific attributes, or the like. A category may also be used as a block. A category may be a classification of items made up of one to many different full or partial keycats.

Global attributes may be used across a plurality of keycats. Block attributes for the item domain may come from either the set of global or keycat specific attributes. Global attributes for the item domain may include keycat, keycat description, system, generation, vendor, item, week added, week completed coding, week last moved, price, UPC description, UPC 70 character description, US Item, maintained, brand code, company code, company name, major brand name, immediate parent company, top parent company, brand type, minor brand name, major brand short description, or the like.

Specific keycat attributes may not be common across keycats. There may be more descriptive attributes that a consumer would look at. Some of these attributes may be common across multiple keycats. Most of the keycat specific attributes may be used as match attributes. However, for each keycat, the most important keycat specific attribute may be used as a block attribute. The match attributes may be where the true match for similarity occurs. Examples of deodorant keycat attributes may include total ounces, total count, base ounces, store location, per unit ounce, product type, package, flavor, scent, strength, additives, form, or the like. The block and match attributes may be selected from a list of deodorant specific attributes, such as per unit ounce, product type, package, flavor, scent, strength, additives, form, or the like.

The similarity process for deciding if items in an item domain are similar may use a probabilistic matching engine, such as the IBM WebSphere QualityStage (QS). The process steps may include: extraction of the items from the item dictionary now and the new repository in the future, conversion of all volumetric attributes and defined attributes for the keycat into specific columns in a table using the long description as values, formatting the information into a fixed length column ASCII file, setting up a new project, entering the data file, mapping the data file columns, setting up and running an investigate stage to develop a frequency analysis of the values for each of the attributes that will be used in the match stage, setting up the block attributes from the list of deodorant specific attributes, or the like. Another process step may be associated with setting up and running a character concatenate investigate stage for each of the attributes, such as per unit ounce, product type, package, flavor, scent, strength, additives, form, and the like, that may be used in the matching process.

It should be appreciated that the probabilistic matching engine methodology is but one of the many methods that may be used within the similarity facility 180. Others methods may include, but are not limited to, time series similarity methods, attribute-based methods, spillage-based methods, information theory methods, classification trees, or some other similarity methodology, combination of similarity methodologies, or plurality of methodologies.

Figure 3:
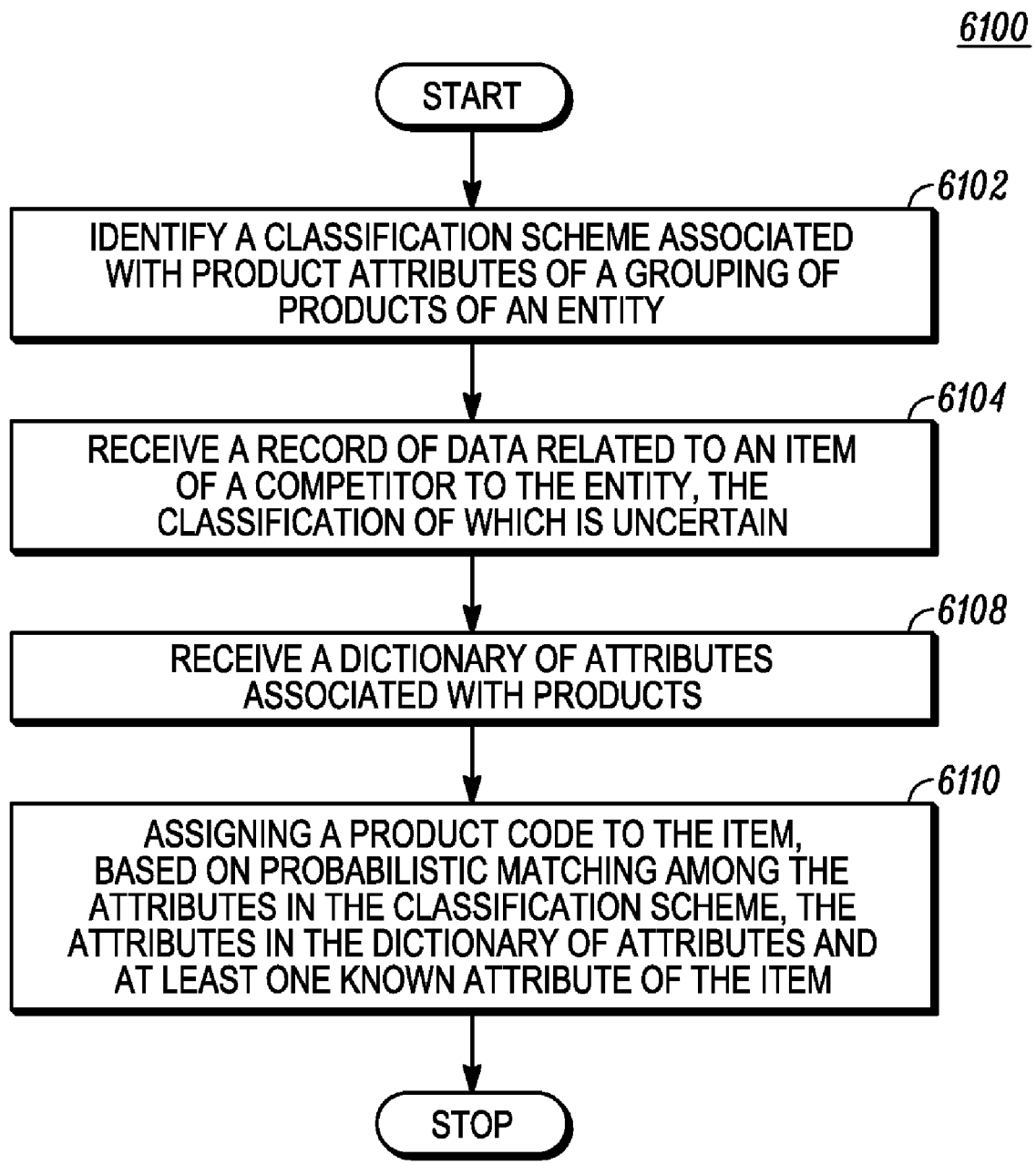
FIG. 3 depicts a logical flow of a similarity matching process using a competitor's products.

In embodiments, referring to FIG. 3, systems and methods may involve using a platform as disclosed herein for applications described herein where the systems and methods involve identifying a classification scheme associated with product attributes of a grouping of products of an entity 6102. It may also involve receiving a record of data relating to an item of a competitor to the entity, the classification of which is uncertain 6104. It may also involve receiving a dictionary of attributes associated with products 6108. It may also involve assigning a product code to the item, based on probabilistic matching among the attributes in the classification scheme, the attributes in the dictionary of attributes and at least one known attribute of the item 6110.

In embodiments, the product attribute may be a nutritional level, a brand, a product category, a physical attribute, may be based on one or more part of a stock keeping unit (SKU) or some other type of product attribute. For example, a product attribute may be 'Reebok'. In this case, the product attribute is a brand. The product attributes may be provided by a similarity facility 180. The similarity facility 180 may associate each attribute with a weight for probabilistic matching.

In embodiments, the product attribute may be the physical attribute. The physical attribute may be a flavor, a scent, packaging type, a product launch type, display location or some other type of physical attribute. For example, the packaging type may be 'hard bound' or 'paperback' in case of a book.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:

using a computer, identifying a hierarchy of products, each product in the hierarchy having known attributes, wherein the hierarchy of products includes blocks of products defined by values of one or more block attributes of the products in the block;

receiving a record of attributes of an unclassified item, the record including block attributes and match attributes of the unclassified item; and assigning a block location in the hierarchy to the unclassified item, based on probabilistic matching among the block attributes of the products in the hierarchy and at least one known block attribute of the unclassified item, and then assigning a location within the block to the unclassified item, based on probabilistic matching among the match attributes of the products in the block location and at least one known match attribute of the unclassified item, thereby classifying the item.

2. The method of claim 1, further comprising iterating the probabilistic matching until a statistical criterion is met.

3. The method of claim 1, wherein the known attribute of the unclassified item is a nutritional level.

4. The method of claim 1, wherein the known attribute of the unclassified item is a brand.

5. The method of claim 1, wherein the known attribute of the unclassified item is product category.

6. The method of claim 1, wherein the known attribute of the unclassified item is based at least in part on a stock keeping unit (SKU).

7. The method of claim 1, wherein the known attribute of the unclassified item is a physical attribute.

8. The method of claim 7, wherein the physical attribute is a flavor.

9. The method of claim 7, wherein the physical attribute is a scent.

10. The method of claim 7, wherein the physical attribute is packaging type.

11. The method of claim 7, wherein the physical attribute is a product launch date.

12. The method of claim 7, wherein the physical attribute is display location.

* * * * *